United States Patent Office 3,836,615
Patented Sept. 17, 1974

3,836,615
METHOD OF FORMING CYLINDRICAL FOAMED CELLULOSE RODS ENCLOSED IN A RIGID SKIN
Saunders E. Jamison, Summit, and Gene H. Anthony, Whitehouse Station, N.J., assignors to Celanese Corporation, New York, N.Y.
No Drawing. Original application July 1, 1966, Ser. No. 562,095, now Patent No. 3,554,202, dated Jan. 12, 1971. Divided and this application Sept. 8, 1970, Ser. No. 70,140
Int. Cl. B29d 27/00; B29f 3/01
U.S. Cl. 264—47                                    5 Claims

ABSTRACT OF THE DISCLOSURE

A cylindrical rod particularly suitable as a cigarette filter is described which is comprised predominantly of foamed fibrous cellulose and a water-insoluble polymer having a glass transition temperature of at most 50° C. and a minor amount of wetting agent, the weight ratio of the polymer to the fibrous cellulose being at least about 0.4, said rod being encased by a skin of said polymer.

---

This application is a divisional application of Ser. No. 562,095, filed July 1, 1966, and now Pat. No. 3,554,202.

This invention relates to the preparation of stable cylindrical rods of foam cellulose encased by a rigid skin. More particularly, it is concerned with the manufacture of improved filters for cigarettes and improved tampons.

The cellulose foam filters described in application Ser. No. 444,104 filed Mar. 29, 1965, assigned to the assignee of the present application and now abandoned, have many advantages over prior art cigarette filters. However, one difficulty with them has been their relatively poor firmness retention during the smoking of the attached cigarette. Tobacco smoke contains a significant amount of moisture such that a cigarette filter tends to lose its firmness during the course of smoking. Such a loss of firmness is of course objectionable to the filter cigarette-smoking public. Moreover, previous methods of forming the requisite rod shape and dimensions have serious disadvantages from the point of view of time, cost and/or the product quality. For example, in the aforesaid application, Ser. No. 444,104 the cellulose foam is drained and poured into molds and allowed to dry. Pouring into small tubes is a slow, tedious, costly process. The foam must be plugged, drained for a long period, dried, removed and compressed considerably. On the other hand, if the foam is cast in large sheets and dried and the filter rod is cut therefrom, some of the cellulose foam is wasted and more importantly, any rigid skin formed by the polymeric binder is lost. Furthermore, significant amounts of the polymeric binder drain off thus representing a loss of relatively expensive starting material.

It is an object of this invention to produce cigarette filter rods which will retain a high level of firmness during smoking. It is a further object of this invention to produce these filter rods in a simple and inexpensive manner.

It is a still further object to prepare improved tampons i.e. structures introduced into a natural or artificial body cavity to arrest hemorrhage, absorb secretions or fill a defect. More particularly it is desired to prepare a tampon which can absorb up to about 15 times its weight of water and yet which at the same time can controllably exhibit a corresponding volume change of from zero to about 10 times its original volume.

These objects have now been achieved by the process of this invention which broadly comprises forming a slurry of critical proportions of fibrous cellulose, wetting agent, and certain water-insoluble resins in water and expanding the slurry to a foam by agitation. The foam, without draining, is then extruded through a cylindrical tube and is deposited on a receiving surface in the form of wet, soft cylindrical units, and then dried.

The concentration of materials in the slurry is critical toward realizing the advantages of this invention. The wood pulp, or other cellulose fiber source, should constitute about 9 to 13 percent, the wetting agent about 0.2 to 2 percent, the water-insoluble resin about 5 to 10 percent and about 80 to 84 percent water. (All parts mentioned in this specification are by weight unless otherwise stated.) The weight ratio of water-insoluble resin to fibrous cellulose in the final product should be about 0.4 or greater.

The fibrous cellulose starting material is conveniently prepared from refined wood pulp having at least a moderate alpha cellulose content, i.e., at least about 75%. If the alpha cellulose content is too low, the "Woody flavors" of lignin are tasted by the smoker. Cotton linters represent another good source. The fiber length is advantageously less than ½ inch, and desirably less than ¼ inch. Longer fibers are more difficult to disperse but may be present in small amounts (e.g. about 1 to 10%) to add strength.

The water-insoluble resin should be one which has the ability to form a continuous film at relatively low temperatures upon the evaporation of water. The resin should have a glass transition temperature of 50° C. or less. Tables of glass transition temperature factors are readily available so that the glass transition temperature of copolymers based on the percent constituent monomers can readily be ascertained by adding the temperature factors of each constituent corresponding to its percentage in the copolymer. For example the glass (transition) temperature of a copolymer consisting of 55% methyl methacrylate, 40% ethyl acrylate and 5% butyl methacrylate can be calculated from the tables of Rohm & Haas Acrylic Glass Temperature Analyzer by adding together the corresponding temperature factors, 1.46, 1.59 and 0.17, respectively, to yield a net temperature factor of 3.22 which corresponds to a glass temperature of 38° C. The minimum film-forming temperature (M.F.T.) is slightly lower than the glass transition temperature due to the presence of impurities. Thus the glass transition temperature represents a readily ascertainable theoretical limit for determining whether a polymer or copolymer is within the scope of the invention.

Homopolymers or copolymers can be employed. Exemplary of suitable resins are polyvinylacetate, polyvinylidene chloride, polybutyl acrylate and cross-linkable acrylics. Homopolymers of vinylchloride, styrene and acrylonitrile are not suitable resins for this invention, however, copolymers in which these monomers are included and which have a suitable low glass transition temperature are utilizable. Numerous commercial formulations are available. It is necessary, of course, for end uses of the foam cellulose rods which involve significant contact with the human body, that the resin be physiologically harmless.

Polyvinyl acetate homopolymer is the preferred water-insoluble resin. The polyvinyl acetate advantageously is of high molecular weight, having an inherent viscosity (measured in standard manner using a 0.4% solution of the polymer in aqueous 80% acetic acid at 25° C.) in the order of about 1.1–1.3.

It has been further discovered that the smoothness of the exterior surface of the drying filter rods critically depends on choice of wetting agent. Non-ionic wetting agents such as saponin and lauric diethanolamide give the best results. Less preferred wetting agents are the cationic ones such as the quaternary ammonium halides, for example cetyltrimethylammonium bromide. Still less preferred are the anionic wetting agents such as sodium lauryl sulfate and dodecylbenzene sodium sulfonate. When these latter wetting agents are used, the exterior of the rod has so many indentations that it cannot be effectively used as a commercial cigarette filter. The wetting agent should of course be compatible with the other ingredients and should have the property of forming relatively stable bubbles or foam in their presence.

The foam, produced in the conventional manner by agitation, is transferred without provision for drainage to the extruding apparatus. It is then extruded through a cylindrical tube and onto a wet surface in the form of a wet cylindrical rod. This rod is surprisingly stable and is self-supporting and in contact with the foreign surface only tangentially at its bottom support. The wet rod is then dried in an oven to remove the water by evaporation. Upon cooling, the water-insoluble resin concentrates to give a firm structure with much of the resin wicking to the surface to give a firm casing to the porous rod in the form of a rigid skin. Any minor deviation of the rod from circular cross-section can be readily corrected by rolling between heated metal plates either about midway in the drying period or after the drying. The rigid skin of this filter rod leads to a high firmness retention. The process of this invention is illustrated in the following embodiment.

EXAMPLE

The following ingredient are introduced into a one-quart Waring Blender: 20 grams acetate grade wood pulp, 30 grams polyvinylacetate homopolymer emulsion (55% solids), 3 grams of saponin and 135 milliliters of water.

The pulp, previously shredded by hand, was slowly added to and dispersed in the mixture, of emulsion and water. When a smooth, thick slurry was achieved, the rate of agitation was increased to produce a foam volume of 400 milliliters. The foam was then transferred to a cylindrical chamber to which a pipe of 1 centimeter in diameter, 1 inch long, is attached. The foam was forced through this pipe by means of a plunger applied by hand from the opposite end of the cylinder. The cylinder of foam issuing from the pipe was deposited on a sheet of Teflon which was placed in an oven at 120° C. After a drying period of about 45 minutes, the rods were removed from the sheet, rolled between aluminum plates at 100° C. and allowed to cool. The rods were then wrapped in cigarette paper with the Ajusta-Betta Cigarette Roller and cut into two centimeter filter tips for attachment to cigarettes.

The firmness retention of these tips was determined by smoking on a machine to a butt length of 3.0 to 3.5 centimeters in 9, two-second puffs of 35 milliliters at one minute intervals. After smoking, the reduction in diameter of these tips under a one pound load was about 20%. Commercial acetate filter tips are compressed about 20–25% under a similar test whereas the cellulose foam filter tips prepared as described in the aforesaid application Ser. No. 444,104 are compressed about 40% under such a test.

Table I further illustrates the excellent results obtainable employing the method of the instant invention. Filters prepared in accordance with the instant invention (Samples 1–6) are compared with filters prepared without observing the critical concentrations of this invention (Samples 7 and 8) and filters prepared in accordance with Example 3 of application Ser. No. 444,104 (Sample 9) and also commercial filters from a commercial cigarette brand (Sample 10).

In Sample 9 the PVAc/pulp ratio in the initial foam composition is significantly different from said ratio in the dried product due to the loss of polyvinyl acetate during drainage. The two sets of values for sample 9 correspond to two different filter tips prepared from the dried foam. Firmness was again determined as the percentage of the original diameter of the filter retained on application of a one-pound load. The tip weight is included to show that the weight of the filter tips of this invention are comparable to those of present commercial filter tips.

TABLE I

| | Wetting agent | Initial foam composition (weight percent) | | | | Filter tip firmness (percent) | | Pressure drop mm. ($H_2O$) | Tip wt. (g.) |
| --- | --- | --- | --- | --- | --- | --- | --- | --- | --- |
| | | Water | Pulp | PVAc | PVAc/ pulp | Before smoking | After smoking | | |
| Sample 1 | 0.5 | 83.5 | 10.5 | 5.5 | .52 | 93 | 83 | 32 | 0.135 |
| Sample 2 | 1 | 82 | 11 | 6 | .55 | 92 | 75 | 33 | 0.140 |
| Sample 3 | 2 | 80 | 12 | 6 | .50 | 89 | 73 | 24 | 0.138 |
| Sample 4 | 2 | 83 | 10 | 5 | .50 | 91 | 83 | 35 | 0.147 |
| Sample 5 | 2 | 83 | 11.5 | 3.5 | .30 | 90 | 66 | 41 | 0.133 |
| Sample 6 | 2 | 80 | 10 | 8 | .80 | 93 | 82 | 34 | 0.164 |
| Sample 7 | 1 | 81 | 13 | 5 | .38 | 89 | 80 | 36 | 0.148 |
| Sample 8 | 2 | 77 | 14 | 7 | .50 | 92 | 71 | 29 | 0.147 |
| Sample 9: | | | | | | | | | |
| Wet | 0.3 | 93.6 | 3.3 | 2.8 | .85 | 80 | 55 | 35 | 0.09 |
| Dry | 1.5 | | 87 | 11.5 | .10 | 86 | 61 | 45 | 0.10 |
| Sample 10 | | | | | | 80 | 73 | 65 | 0.14 |

Note that although the ratio of polyvinyl acetate to pulp in the extruded rods is much greater than in the rods prepared in accordance with the method of application Ser. No. 444,104, said ratio is actually significantly less than the initial ratio in the foam recipe in the latter method.

The stable foam cellulose rods of this invention can also be employed as tampons, i.e. inserted into body cavities. They have a smooth exterior and are non-abrasive. Due to the nature of the instant inventive process, the rod diameter can readily and inexpensively be adjusted to meet varying size requirements merely by regulating the diameter of the extrusion cylinder. When swelling of the tampon is not desired, the foamed cellulose rod as above produced can be directly used. Where swelling of the tampon in situ is desired, as for example to afford a tighter fit, the above-produced rod can be immersed in water, squeezed down and dried at up to about $\frac{1}{10}$ to $\frac{1}{5}$ of its original volume. When thus employed the tampon expands up to its original volume upon absorbing liquid.

Numerous variants of the above described foamed cellulose rods and processes for their manufacture will be apparent to one skilled in the art within the scope of the present invention.

What is claimed is:

1. A method of preparing cylindrical foamed cellulose rods enclosed in a rigid skin comprising (1) agitating a mixture containing by weight about 9–13% fibrous cellulose, 5–10% of a water-insoluble resin having a glass transition temperature of at most 50° C., and the ability to foam a continuous film at relatively low temperatures upon the evaporation of the mixture 0.2–2% of a wetting agent selected from the group of non-ionic and cationic wetting agents, and 80–84% water, to produce a foam, (2) extruding said foam, without prior drainage, through a cylindrical tube to form a wet cylindrical rod, (3) drying the rod at a temperature of about 100–150° C., and (4) cooling said rod to form a firm structure due to wicking of the resin to the surface of the structure.

2. A method according to Claim 1 wherein the wetting agent is non-ionic.

3. A method according to Claim 1 wherein the wetting agent is saponin.

4. A method according to Claim 1 wherein the water-insoluble resin is vinyl acetate homopolymer.

5. A method according to Claim 1 wherein the rod is at least partially dried and rolled between heated plates.

References Cited

UNITED STATES PATENTS

| | | | |
|---|---|---|---|
| 3,311,115 | 3/1967 | Mueller et al. | 131—269 X |
| 3,489,827 | 1/1970 | Mueller et al. | 264—50 |
| 3,574,803 | 4/1971 | Allen et al. | 264—50 |
| 3,509,245 | 4/1970 | Santangelo | 264—50 |

OTHER REFERENCES

Miller, M. L., "The Structure of Polymers," New York, Reinhold, 1968, pp. 476–481 (SPE Polymer Science and Engineering Series).

PHILIP E. ANDERSON, Primary Examiner

U.S. Cl. X.R.

131—269; 264—50, 176 R